March 23, 1965 R. B. FIELD 3,174,236
SHOE UPPER-STIFFENER ASSEMBLY
Filed Nov. 23, 1962 2 Sheets-Sheet 1

INVENTOR.
Robert B. Field
BY Albert Gordon
ATT'Y

March 23, 1965  R. B. FIELD  3,174,236
SHOE UPPER-STIFFENER ASSEMBLY
Filed Nov. 23, 1962  2 Sheets-Sheet 2

INVENTOR.
Robert B. Field
BY Albert Gordon
ATT'Y

ABC# 3,174,236
SHOE UPPER-STIFFENER ASSEMBLY
Robert B. Field, Norwell, Mass., assignor to
Jacob S. Kamborian, West Newton, Mass.
Filed Nov. 23, 1962, Ser. No. 239,650
11 Claims. (Cl. 36—68)

This invention relates to a novel shoe upper-stiffener assembly that is useful in carrying out a counter forming and heel seat lasting operation such as that disclosed in Patent No. 3,144,670.

In the aforementioned application, and in pending application Serial No. 134,641, filed August 29, 1961, there is provided a counter stiffner made of thermoplastic material that is inserted into a counter pocket formed by a liner stitched to the heel of the upper, so that a concealed portion of the counter is located within the pocket and an exposed portion of the counter extends out of the pocket by an amount that corresponds to the lasting margin of the upper. The counter is coated on both sides with a thermoplastic adhesive. The thermoplastic counter and the thermoplastic adhesive coatings are so constructed that at ambient or normal room temperatures the counter is rigid and the adhesive coatings are rigid and highly cohesive, when heated above a predetermined temperature the counter becomes soft and pliable and the adhesive coatings become tacky and less cohesive, and when cooled back to ambient temperatures the counter reverts to its rigid condition and the adhesive coatings revert to their rigid, highly cohesive condition.

In using the counter, it is placed in the counter pocket of the upper and heated above said predetermined temperature, mounted on a last having an insole on the last bottom so that the concealed portion of the counter and the liner bear against the heel of the last and the exposed portion of the counter and the lasting margin of the upper extend away from the insole. The upper is then subjected to conforming stresses that cause the heel of the upper and the now pliable counter to be molded to the shape of the last, and while these stresses are maintained the exposed portion of the counter and the lasting margin of the upper are wiped against the insole by wiping stresses. Due to the tacky condition of the adhesive coatings on the counter, the upper and linear are bonded to the counter and the lasting margin of the upper is bonded to the insole by way of the counter. When the counter has cooled sufficiently to render the counter and adhesive coatings thereon rigid, the conforming stresses and wiping stresses are released, and the resultant product provides a shoe upper that is bonded to the insole at the heel and whose heel is rigidly and accurately shaped to the contour of the heel of the last.

While the above described operation does result in a satisfactory product, it does entail using a separate liner and counter and the counter interposed between the lasting margin of the upper and the insole provides an added bulk which is sometimes objectionable. There are presently available heat soltenable, unitary counter-liners that take the place of a separate counter and liner. These counters have a heat activatable back that bears against and is bondable to the upper under pressure. The fronts of these counters, since they bear directly against the shoe wearer's foot are usually flocked or otherwise treated to provide an anti-slip characteristic, and in any event are not made adherent.

The principal object of this invention is to provide an uppercounter assembly that may be utilized in the counter-forming and heel seat lasting method of the aforementioned Patent No. 3,144,670 and which will retain the advantages of economy and reduced bulk of the unitary counter-liners. This is accomplished by stitching the top of the counter to the top line of the heel of the upper so that the bottom of the counter is spaced from the bottom of the upper by an amount that substantially corresponds to the width of the lasting margin of the upper. Inwardly of the upper and in the space between the bottoms of the counter and upper there is provided a heat-activable adherent material which in one form of the invention is a layer of adhesive deposited on the upper and in another form is a tape having adhesive on both its faces that is secured either to the counter or the upper. When utilizing this assembly in carrying out the aforementioned method, the assembly is heated and placed on the last, and the conforming and wiping stresses are applied as described above. The conforming stresses cause the counter to be molded to the shape of the last and the counter to be bonded to the upper by way of the adhesive on the back of the counter. The wiping stresses causes the lasting margin of the upper to be bonded to the insole by way of the adherent material located in the space between the bottom of the counter and the bottom of the upper.

Figure 1:
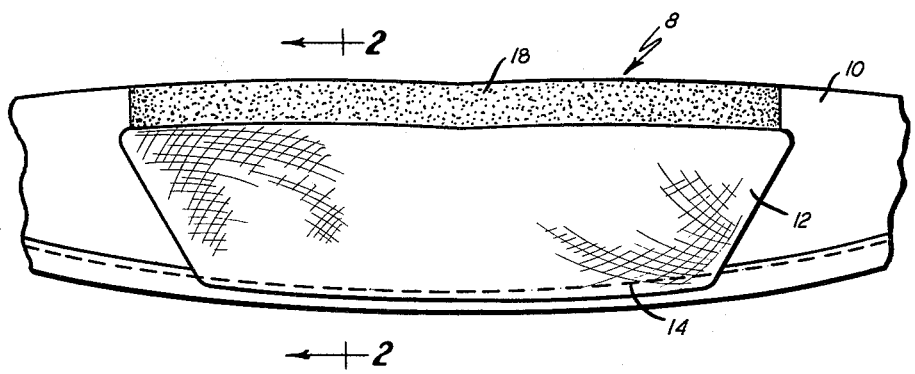
FIGURE 1 is a view of the upper-counter assembly positioned bottom-up wherein the adherent material is composed of the layer of adhesive deposited on the upper.
Figure 2:
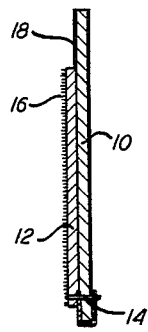
FIGURE 2 is a section taken on the line 2—2 of FIGURE 1.

Referring to FIGURES 1 and 2, the upper-counter assembly is designated by the number 8. The assembly includes a shoe upper 10 and a counter 12 stitched to the heel of the upper at its top line by stitching 14. The counter is of known construction made of cloth or fabric impermeated with a thermoplastic material and has its back, that is the side that faces the upper 10, coated with a thermoplastic adhesive. The thermoplastic material is rigid at ambient temperatures so as to render the counter rigid but softens when heated to a predetermined temperature so as to render the counter soft and pliable. A cooling of the counter below this predetermined degree back to ambient temperatures causes the thermoplastic material to rigidify and thus return the counter to its normal rigid condition. While the counter is in its heated pliable condition, it may be molded or shaped by the application of stress thereto. The thermoplastic adhesive on the back of the counter is so constructed as to be normally rigid and highly cohesive at ambient temperatures, but becomes tacky, adherent and less cohesive when heated to a temperature corresponding to the softening temperature of the thermoplastic material and reverts to its rigid, highly adhesive condition when cooled back to ambient temperatures. The front of the counter, that is the side facing away from the upper 10, is coated with a flocked surface 16 which may be a sueded lining having fibers projecting therefrom. The flocked surface has a non-slip characteristic so as to provide comfort to the wearer of the finished shoe when his heel bears against the counter. An example of a known counter of this type is flocked Rayheet manufactured by the Harvard Coated Products Co., Inc. and disclosed in Patent Numbers 2,619,441 and 2,684,540.

The bottom of the counter 12 is spaced from the bottom of the upper 10 by an amount that approximates the width of the lasting margin of the upper. In this space there is deposited a layer or ribbon of thermoplastic adhesive 18 which has the characteristic of being rigid and highly cohesive at ambient temperatures, but becomes tacky, adherent and less cohesive when heated to a temperature at which the thermoplastic material in the counter 12 becomes soft and at which the thermoplastic adhesive on the back of the counter becomes tacky and adherent and of reverting to its rigid, highly cohesive condition when cooled back to normal temperature.

One example of adhesive 18 that has proven to be satisfactory is a mixture of 40 parts by weight of Elvax 150 made by E. I. Du Pont de Nemours & Co., 60 parts by weight of Krumbhaar K–300 made by the Krumbhaar Resin Division of Lawter Chemicals, Inc. and 10 parts by weight of Fortex made by the Warwick Wax Division of Western Petrochemical Corp. The first two ingredients are melted together, the third ingredient is stirred into the melt and the resultant hot melt is applied onto the upper.

The assembly is utilized in a heel seat lasting operation similar to that disclosed in the aforesaid Patent No. 3,144,670. The assembly is heated to a temperature sufficient to render the counter soft and pliable by softening the thermoplastic material therein, to render the adhesive on the back of the counter tacky and adherent and to also render the adhesive 18 tacky and adherent about 225° F. to 250° F. having been found to be sufficient for this purpose.

An apparatus such as that disclosed in Patent No. 3,115,651 or in Patent No. 3,122,763 may be utilized for this purpose.

Figure 3:
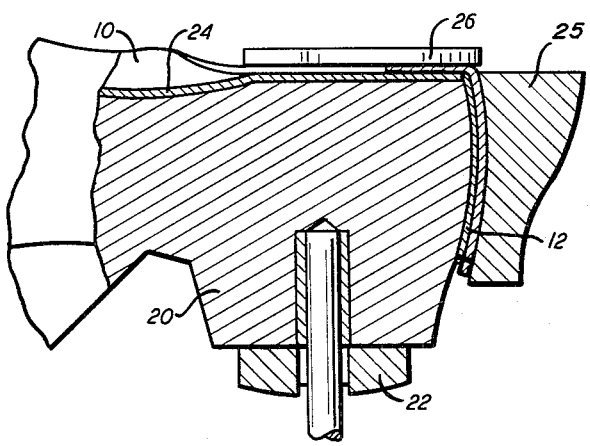
FIGURE 3 is a section of the upper-counter assembly of FIGURE 1 mounted on a last showing the condition of the assembly and the insole at the completion of the wiping operation.

The assembly is now draped about a last 20 (FIGURE 3) supported bottom-up on a last support 22. The last has an insole 24 located on its bottom and the assembly 8 is so positioned on the last that the counter 12 extends around the heel of the last with the bottom of the counter substantially coextensive with the bottom of the insole 24 and the lasting margin of the upper and the layer of adhesive 18 extending upwardly of the insole. The assembly 8 is now subjected to the upper stretching, assembling, clamping and wiping steps described in the aforementioned Patent No. 3,144,670. These steps comprise stretching the upper tightly about the heel of the last and pulling the top line of the upper tightly on the last to assemble the upper properly on the last and tension mold the counter to the shape of the last, clamping the upper and counter on the last by a heel clamp 25 to hold the upper and counter rigidly against the heel of the last and compression mold the counter to the shape of the last, and wiping the margin of the upper against the insole by wiping means 26 while the upper is stretched, pulled and clamped. As a result of these actions, the counter is effectively molded to the shape of the last, the margin of the upper is bonded to insole through the adhesive 18 to adhesively unite the upper and insole and the counter is united to the upper by way of the adhesive on the back of the counter. At about the completion of the wiping step, the assembly 8 has cooled sufficiently to cause the counter to reassume its rigid condition and to cause the adhesive on the back of the counter and the adhesive 18 to revert to their hard condition so that the stretching and clamping stresses applied to the upper may be released. It can thus be seen that a shoe is produced that has a rigid counter at its heel which is adhesively united to the heel of the upper and which has the wiped in lasting margin of the upper adhesively united to the insole at the heel and wherein the counter is accurately contoured to the heel of the last.

Figure 4:
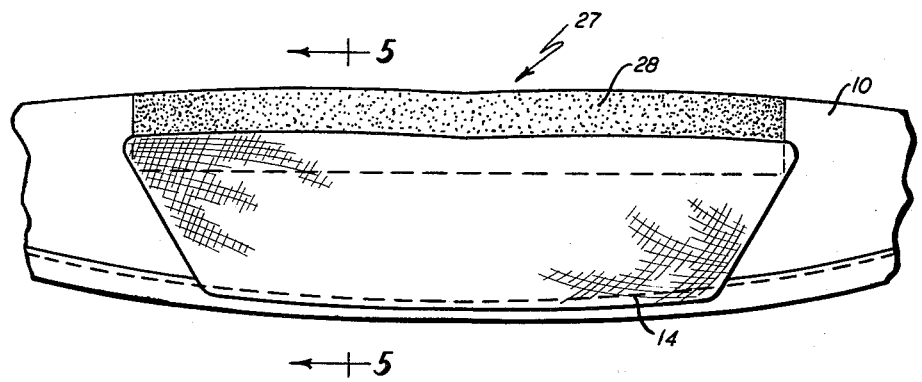
FIGURE 4 is a view of the upper-counter assembly similar to FIGURE 1, but showing the adherent material as being the tape secured to the counter.
Figure 5:
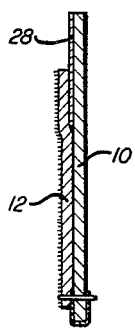
FIGURE 5 is a section taken on the line 5—5 of FIGURE 4.
Figure 7:
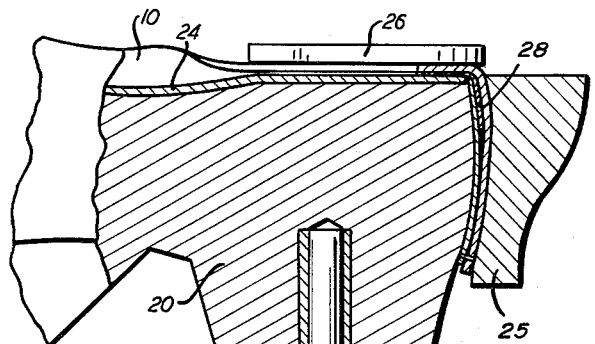
FIGURE 7 is a section similar to that of FIGURE 3, but showing the upper-counter assembly of FIGURE 4.

In FIGURES 4–7 there is shown a different embodiment of the invention which includes an upper-counter assembly 27 that utilizes a tape 28 instead of the ribbon 18. The tape is an open mesh cloth saturated with thermoplastic adhesive on both sides, which adhesive may be identical to the composition of the ribbon 18 described above. The resultant tape has adhesive on both of its sides which is normally rigid and highly cohesive, which becomes tacky and adherent when heated a predetermined amount above ambient temperatures and which reverts to its rigid, highly cohesive state when cooled back to ambient temperatures. A length of the tape 28 which is substantially equal in length to the length of the counter 12 is bonded to the back of the counter by means of a hot iron so that a portion of the tape having a width that substantially equals the width of the lasting margin of the upper 10 extends away from the counter as indicated in FIGURE 4. In some cases, it has been found desirable to have the tape extend beyond the counter to the shank of the upper. The assembled counter and tape is stitched to the upper to form the assembly 27 in the manner described above (FIGURES 4 and 5). The assembly 27 is heated, draped on the last 20, subjected to the conforming stresses and lasted in the manner described above in connection with the assembly 8. At the completion of the lasting operation and after the assembly 27 has cooled sufficiently to render the adhesive on the counter 12 and tape 28 rigid and cohesive, the lasting margin of the upper 10 is united to the insole by way of the tape 28, the portion of the counter abutting against the upper is bonded to the upper by way of the adhesive on the back of the counter, and the portion of the counter that is adhered to the tape is united to the upper by way of the adhesive on the back of the counter and the adhesive on the tape.

Figures 6, 8:
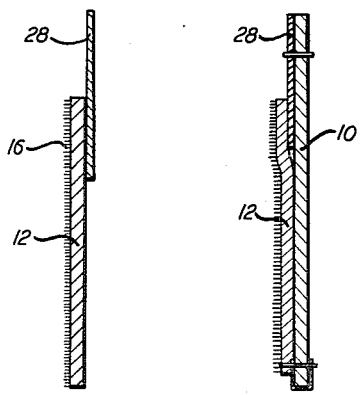
FIGURE 6 is a section showing the counter and tape before the counter is stitched to the upper.
FIGURE 8 is a section showing the tape secured to the upper instead of the counter.

Instead of adhesively attaching the tape 28 to the counter 12, it may be stitched to the inner face of the upper to cover the lasting margin of the upper with the lower end of the tape tucked behind the back of the counter (see FIGURE 8). This modification is treated in the same manner as the modification of FIGURES 4–7 in the counter forming and heel seat lasting operation with the result that the lasting margin of the upper is bonded to the insole by way of the tape and the counter is bonded to the upper by way of the adhesive on the back of the counter.

While the assembly discussed above comprises a counter stiffener associated with the heel end of an upper, in its broadest aspects the invention is equally applicable to a box toe stiffener associated with the toe end of the upper.

It should be understood that the present disclosure is for the purpose of illustration only and this invention includes all modifications and equivalents which fall within the scope of the appended claims.

I claim:

1. A shoe assembly comprising: an upper; a stiffener that is rigid at ambient temperatures, becomes soft and pliable when heated to a predetermined temperature above ambient temperatures, and reverts to its rigid condition when cooled back to ambient temperatures; means connecting the stiffener to an end of the upper so that the back of the stiffener faces said end of the upper, the front of the stiffener faces inwardly of said end of the upper and the bottom of the stiffener is spaced from the bottom of the upper to provide a lasting margin on the upper; adherent means on the back of the stiffener that is unbonded to the upper and that is rigid and highly cohesive at ambient temperatures, becomes tacky and less cohesive when heated to said predetermined temperature and reverts to its rigid, highly cohesive condition when cooled back to ambient temperatures; and an adherent material located inwardly of the upper in the space between the bottoms of the upper and stiffener that is rigid and highly cohesive at ambient temperatures, becomes tacky and less cohesive when heated to said predetermined temperature, and reverts to its rigid, highly cohesive condition when cooled back to ambient temperatures.

2. The assembly according to claim 1 wherein the means connecting the stiffener to the upper comprises: stitching securing the top of the stiffener to the top line of the upper.

3. The assembly according to claim 1 wherein the adherent material comprises: a ribbon of adhesive deposited on the upper.

4. The assembly according to claim 1 wherein the adherent material comprises: a tape having adhesive on both of its sides.

5. The assembly according to claim 4 wherein the tape is secured to the back of the stiffener.

6. The assembly according to claim 4 wherein the tape is secured to the upper.

7. The assembly according to claim 1 wherein the front of the stiffener is covered by a flocked surface.

8. A shoe assembly comprising: an upper; a stiffener that is rigid at ambient temperatures, becomes soft and pliable when heated to a predetermined temperature above ambient temperatures, and reverts to its rigid condition when cooled back to ambient temperatures; stitching connecting the top of the stiffener to the top line of the upper so that the back of the stiffener faces said end of the upper, the front of the stiffener faces inwardly of said end of the upper and the bottom of the stiffener is spaced from the bottom of the upper to provide a lasting margin on the upper; a flocked surface coated on the front of the stiffener; a coating of adhesive on the back of the stiffener that is unbonded to the upper and that is rigid and highly cohesive at ambient temperatures, becomes tacky and less cohesive when heated to said predetermined temperature and reverts to its rigid, highly cohesive condition when cooled back to ambient temperatures; and an adherent material located inwardly of the upper in the space between the bottoms of the upper and stiffener that is rigid and highly cohesive at ambient temperatures, becomes tacky and less cohesive when heated to said predetermined temperature, and reverts to its rigid, highly cohesive condition when cooled back to ambient temperatures.

9. The assembly according to claim 8 wherein the adherent material comprises: a ribbon of adhesive deposited on the upper.

10. The assembly according to claim 8 wherein the adherent material comprises: a tape having adhesive on both of its sides secured to the back of the stiffener.

11. The assembly according to claim 8 wherein the adherent material comprises: a tape having adhesive on both its sides secured to the upper.

References Cited by the Examiner
UNITED STATES PATENTS

| Re. 21,267 | 11/39 | Thurston | 12—146 |
| 1,240,794 | 9/17 | Presby | 12—145 X |
| 1,996,890 | 4/35 | Turner | 36—46.5 X |
| 2,062,528 | 12/36 | Raeder | 12—145 |
| 2,206,900 | 7/40 | King | 12—146 X |
| 2,344,458 | 3/44 | Colella | 12—146 |
| 2,611,195 | 9/52 | Brophy et al. | 12—146 X |
| 2,684,540 | 7/54 | Levy | 36—68 |

JORDAN FRANKLIN, *Primary Examiner.*
DAVID J. WILLIAMOWSKY, *Examiner.*